(12) United States Patent  
Englert et al.

(10) Patent No.: US 8,555,502 B2  
(45) Date of Patent: Oct. 15, 2013

(54) METHOD FOR PRODUCING A METAL PART

(75) Inventors: Peter Englert, Bad Friedrichshall (DE); Bernd Grünenwald, Nürtingen (DE); Matthias Türpe, Marbach a. N. (DE)

(73) Assignee: BEHR GmbH & Co. KG, Stuttgart (DE)

( * ) Notice: Subject to any disclaimer, the term of this patent is extended or adjusted under 35 U.S.C. 154(b) by 1475 days.

(21) Appl. No.: 12/162,535

(22) PCT Filed: Jan. 29, 2007

(86) PCT No.: PCT/EP2007/000737  
§ 371 (c)(1),  
(2), (4) Date: Jul. 29, 2008

(87) PCT Pub. No.: WO2007/085484  
PCT Pub. Date: Aug. 2, 2007

(65) Prior Publication Data  
US 2009/0011202 A1 Jan. 8, 2009

(30) Foreign Application Priority Data  
Jan. 30, 2006 (DE) .......................... 10 2006 004 347

(51) Int. Cl.  
*B21D 53/02* (2006.01)

(52) U.S. Cl.  
USPC .............. 29/890.03; 29/890.032; 29/890.038; 29/890.039; 29/890.053; 148/26; 228/183; 228/223

(58) Field of Classification Search  
USPC ......... 29/890.03, 890.032, 890.038, 890.039, 29/890.053; 148/26; 228/183, 223  
See application file for complete search history.

(56) References Cited

U.S. PATENT DOCUMENTS

| | | | | |
|---|---|---|---|---|
| 3,458,925 A | * | 8/1969 | Napier et al. | 438/613 |
| 3,916,042 A | * | 10/1975 | Grietens | 427/269 |
| 4,237,607 A | * | 12/1980 | Ohno | 29/840 |
| 4,801,069 A | * | 1/1989 | Ankrom et al. | 228/180.21 |
| 4,802,276 A | * | 2/1989 | Bowcutt et al. | 29/739 |
| 5,139,822 A | | 8/1992 | Hepler et al. | |

(Continued)

FOREIGN PATENT DOCUMENTS

| | | |
|---|---|---|
| CN | 1618001 A | 5/2005 |
| EP | 1 004 386 A1 | 5/2000 |
| EP | 1 287 941 A1 | 3/2003 |
| WO | WO 01/38040 A1 | 5/2001 |

OTHER PUBLICATIONS

Instructions on Automobile Radiator Repair by Richard Tixtenning in Sheet Metal Worker, Dec. 1920, pp. 37-328.*

(Continued)

*Primary Examiner* — Carl Arbes  
(74) *Attorney, Agent, or Firm* — Foley & Lardner LLP

(57) ABSTRACT

The invention relates to a method for producing a metal part. Said method comprises the steps of supplying a strand of metal material and applying a coating from a fluxing agent composition to a surface of the strand of material by means of an application device (1), said fluxing agent composition being applied to only a defined portion of the surface of the strand of material by means of the application device (1).

17 Claims, 4 Drawing Sheets

(56) References Cited

U.S. PATENT DOCUMENTS

| | | | |
|---|---|---|---|
| 5,616,424 A * | 4/1997 | Carey et al. | 428/647 |
| 5,695,822 A * | 12/1997 | Carey et al. | 427/329 |
| 6,199,750 B1 * | 3/2001 | Kouno et al. | 228/183 |
| 6,325,276 B1 * | 12/2001 | Kawano et al. | 228/183 |
| 6,609,652 B2 * | 8/2003 | MacKay et al. | 228/254 |
| 6,783,056 B2 * | 8/2004 | Kouno et al. | 228/183 |
| 7,819,301 B2 * | 10/2010 | Mackay | 228/33 |
| 2003/0136817 A1 | 7/2003 | Stoops | |

OTHER PUBLICATIONS

Office Action issued Apr. 14, 2011 in corresponding Chinese application No. 200780003824.2.

* cited by examiner

METHOD FOR PRODUCING A METAL PART

The invention relates to a process for producing a metal part and to a metal part produced by this process and an apparatus for producing the metal part.

In the production of metal parts, application of a flux composition to a surface in order to make subsequent soldering possible is generally known. This can be a flux composition which already contains solder constituents such as metal powder or a pure flux which is, for example, applied to a surface plated with a layer of metallic solder.

WO 01/38040 A1 describes the production of an aluminum product, in which a metal sheet or profile is supplied from a roll and is subsequently coated over its area with a flux by means of an application roll. The applied material is subsequently dried in a heating device and the metal sheet is rolled up again to form a roll. Considerable amounts of flux and organic binder are required for this application over the area of the metal sheet, and these can also be present in excess in later uses of the coated metal strip and can have undesirable effects.

It is an object of the invention to provide a process for producing a metal part, in which the amount of flux applied is reduced.

According to the invention, this object is achieved for a process as described at the outset by at least one embodiment of the present invention. The application of the flux composition to only a defined part of the surface by means of the application apparatus makes it possible, in automatic and thus inexpensive application, for a considerably smaller part or none at all of the area which is later not subjected to a soldering process to be coated with flux. In this way, excess flux on the finished product is avoided. In addition, the amount of flux required is reduced, which saves money. The strip of material is generally a band or metal sheet or a profile, it can be present as strip material, as roll material or in another way as continuous of pseudocontinuous material stock. In particular, the strip of material within the meaning of the invention can also have a cross section which changes in the direction in which it is conveyed.

The application apparatus particularly preferably comprises an application roll so that reliable and simple application of the flux by rolling-on is made possible. However, other means of application can generally also be provided, for instance screen printing apparatuses.

In a preferred embodiment, the process further comprises a step of cutting a plurality of sections of the strip of material to length to produce individual coated metal parts. Thus, the production of individual metal parts is carried out only after the defined application of the flux to part of the area of a continuous or pseudocontinuous strip of material, as a result of which a higher overall degree of automation compared to the prior art is made possible.

The only partial application is advantageously made possible in a simple way by the application roll having a structure corresponding to the defined part of the surface of the strip of material. However, an application roll can also be without a structured surface, in which case the flux composition is applied in a defined manner to only part of the application roll by other means, for example selective spraying-on of the flux.

The strip of material preferably comprises an aluminum alloy. Many flux compositions which can be applied by automated means are known for aluminum alloys. A preferred flux composition is described in EP 1 287 941 A1.

In a useful embodiment, the surface of the strip of material supplied is already plated at least partly with a solder. In this case, it is possible for the flux composition not to contain any metallic solder. Such a flux composition can be applied particularly easily. In addition, the combination of a pure flux composition with plated-on solder is particularly effective since the application density of the metal or the plating is generally more critical for a soldering process than the application density of the flux. However, as an alternative or in addition, it is also possible for the flux composition to contain a metallic constituent, in particular pulverulent metal, or a chemically bound constituent which becomes metallic during the soldering process. An example is the product Silflux from Solvay. A flux composition within the meaning of the invention can also make it possible for the solder to be formed from the surface of the strip of material itself by reactions during the soldering process.

In a particularly preferred embodiment, the sections and/or the strip of material are formed to produce tubes of a heat exchanger. The tubes are particularly preferably flat tubes which very particularly preferably have at least one crease or web to produce separate chambers within the tube. In the case of such flat tubes provided with creases or webs, in particular, soldering along the creases or webs which abut in the interior of the tube is desirable in order to ensure hermetic sealing of separate parallel chambers from one another. At the same time, the amount of flux present within the tube should be limited so that contamination of a coolant used later in the heat exchanger does not take place and no flux residues can block narrow points in the heat exchanger or deposit there.

In a further preferred embodiment, the sections and/or the strip of material are formed to produce collection boxes of a heat exchanger. All-aluminum heat exchangers in which end-face collection boxes of aluminum have an essentially U-shaped profile, with the end parts of the interior surfaces of the legs of the profile being soldered over their area to exchanger tubes, are known. Relatively large amounts of solder and flux are required at these soldered areas. To avoid an excess of flux composition in the interior of the heat exchanger, it is advantageous, according to the invention, for only these border regions which are actually soldered to other components to be provided with a flux coating. The sections can also be formed to produce bottoms, side parts or other components of a heat exchanger.

In particularly preferred embodiments, the defined part of the surface comprises at least one, in particular a plurality of, stripes running continuously in the feed direction of the strip of material. In such a selective mode of application, it can be advantageous, for example, for at least partial shaping of the strip of material to occur before it is divided into individual metal parts. As an alternative or in addition, the defined part of the surface can also comprise at least one structure which is repeated at regular intervals and does not run continuously in the feed direction of the strip of material. The configuration of the defined part of the surface of the strip of material which is provided with the flux composition depends merely on the specific requirements for the further production of the metal parts.

In an advantageous embodiment of the process of the invention, the defined parts of the surface are produced at least partly as embossed depressions, in particular by means of an embossing roll preceding the application roll. In this way, it can be ensured that, at least in sections or else over the entire area, the application of the flux composition does not cause an increase in diameter of the strip of material by the flux composition being applied locally at the site of the depressions. This is particularly advantageous in the case of components in the case of which stacking of a plurality of the individual parts with flux layers present on each individual part would put an overall dimensional tolerance of the stack in doubt.

In an alternative or supplementary embodiment of the invention, the application apparatus comprises a spray apparatus for squirting and/or spraying the flux composition onto the strip of material. The method of squirting-on or spraying-on by means of an appropriate spray apparatus enables the flux composition to be applied inexpensively and reliably. The spray apparatus particularly advantageously comprises a plurality of separately controllable spray nozzles. The spray apparatus and/or the spray nozzles can be configured so as to be movable and/or operate intermittently or with a changeable amount applied, so that structuring of the flux composition applied can be effected according to requirements.

In a further advantageous embodiment, the applied flux composition has at least one gradated region. For the present purposes, a gradated region is a region in general which has an alterable thickness or density of the flux composition. The gradation can be, in particular, in the feed direction or perpendicular thereto.

A metal part is produced by the process described in at least one embodiment of the present invention.

An apparatus for producing the metal part is described in at least one embodiment of the present invention. The structuring of the surface of the application roll makes a considerable reduction in application of excess flux compared to the prior art possible when application of the flux composition is automated. In a preferred embodiment, the apparatus for producing the metal part additionally comprises an embossing roll for introducing depressions into the strip of material preceding the application roll. In a particularly preferred embodiment, the application roll is followed by means for dividing the strip of material into individual sections, so that there is a high degree of integration of automated production steps for obtaining the metal part in a joint production apparatus.

These and further features can be derived from the examples described below and from the dependent claims. A preferred example of a process according to the invention is described below and explained in detail with the aid of the accompanying drawings.

In a process according to the invention, a strip of aluminum sheet plated with solder over its entire area is initially provided as roll material. The sheet is fed by means of a feed device into an application apparatus for automated application of a liquid composition. The application device comprises an application roll 1 which has a structured surface 1a-1g. A flux composition having a paste-like consistency is applied from a reservoir onto the application roll 1, after which it is transferred to the moving strip of material by rolling of the application roll along the strip.

Since the application roll 1 has a structured surface, liquid composition is applied only via the projecting regions of the structured surface and/or only from these regions onto the strip of material. As a result, the liquid composition is applied only to defined parts of the surface of the strip of material running through the apparatus.

Figure 1:
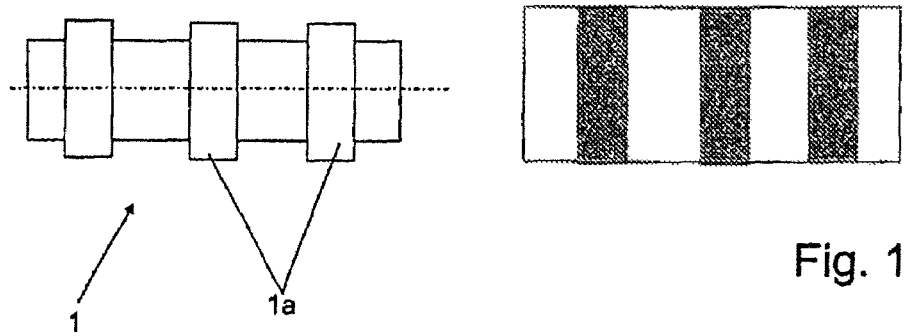
FIG. 1 to FIG. 7 shows seven different schematic depictions of application rolls having structured surfaces and also in each case a schematic depiction of the coating produced on a strip of material by means of the application rolls.
Figure 2:
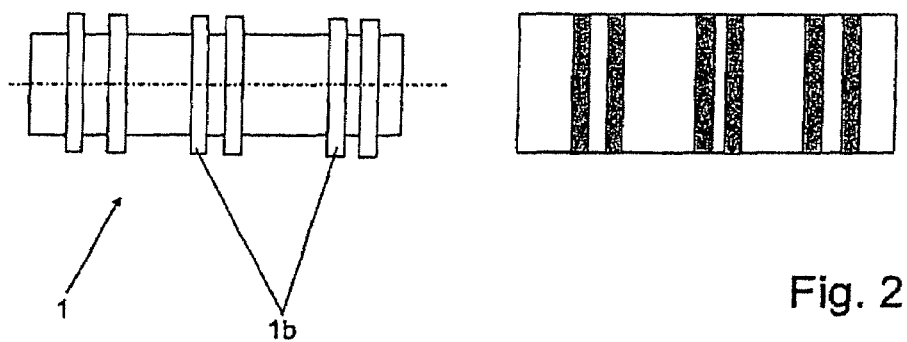
Figure 3:
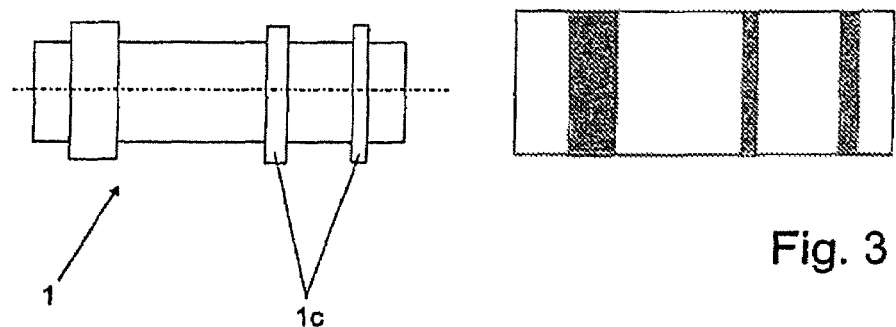

The drawings FIG. 1 to FIG. 7 depict seven illustrative structurings of application rolls 1a-1g. In the examples of FIG. 1 to FIG. 3, the roll has parallel rings running around its entire circumference. This achieves coating of the strip of material in the form of continuous stripes in the direction in which it is conveyed. Number, width and distribution of the stripes in the transverse direction of the strip of material can be chosen freely as a function of the respective requirements.

Figure 4:
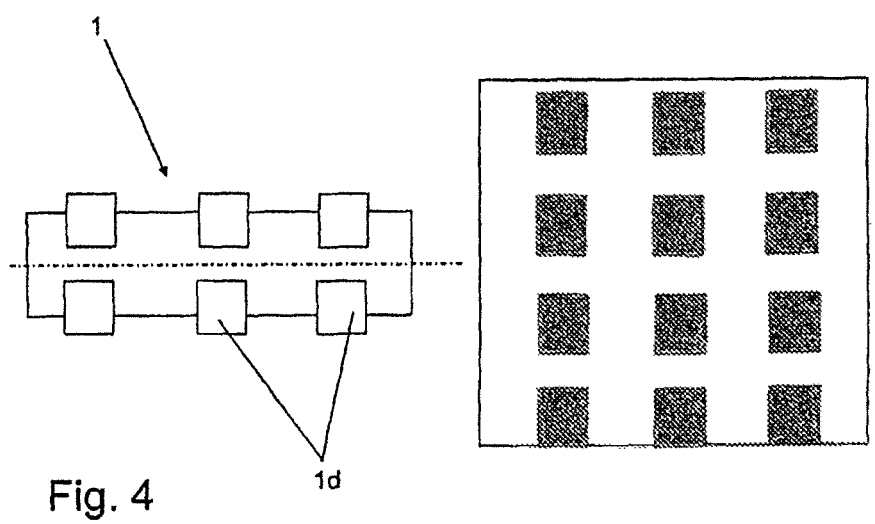
Figure 5:
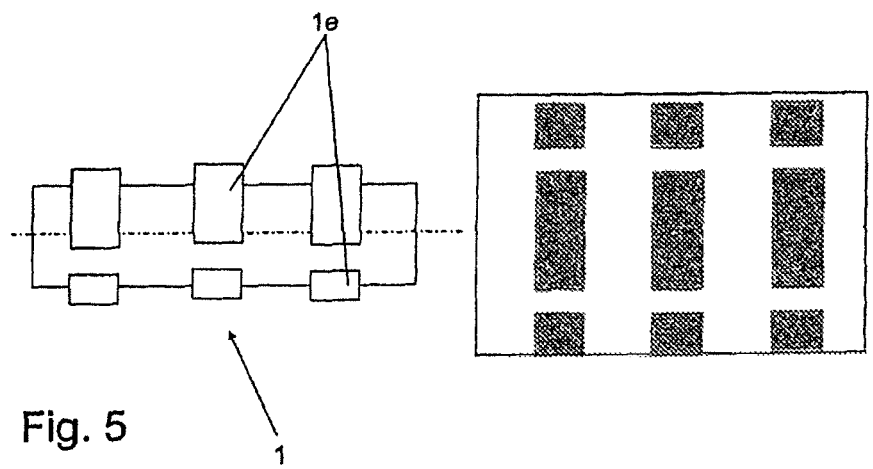

In the examples of FIG. 4 and FIG. 5, the raised regions of the application roll have interruptions not only perpendicular to the unrolling direction but also in the unrolling direction. Accordingly, areas printed with flux composition which are interrupted in the feed direction of the strip of material are produced. In the example of FIG. 4, all of the printed areas have the same spacing in the feed direction. In FIG. 5, printed areas of different lengths alternate in the feed direction. In the example of FIG. 5, the pattern is repeated only after a complete revolution of the application roll 1.

Figure 6:
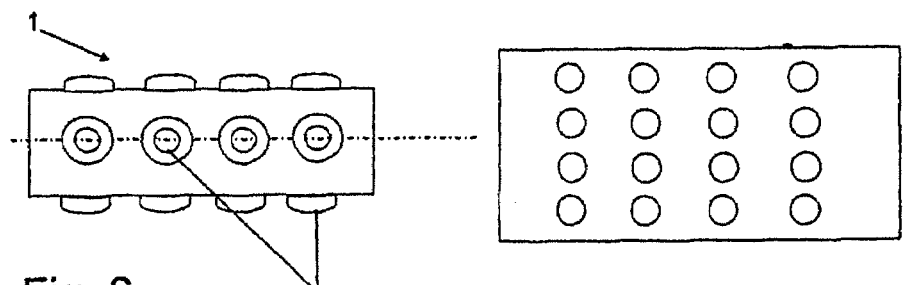
Figure 7:
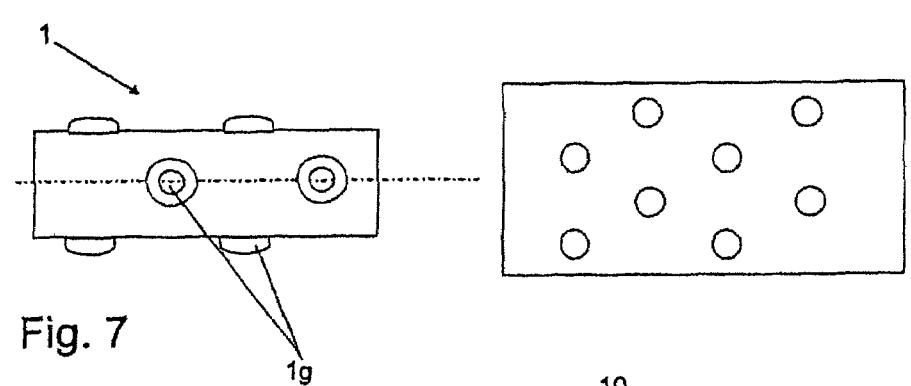

The examples of FIG. 6 and FIG. 7 show embodiments of the application roll in which the printed regions are dots or circles. The projecting surface structures 1f, 1g of the application rolls are for this purpose provided with a mushroom-like curvature and are essentially circular in cross section.

An embossing roll by means of which the structures can be embossed into the surface of the strip of material can be located upstream of the application roll. These structures are linked in respect of the transport of the strip of material with the position of the transport roll so that synchronous coating with liquid composition occurs only in the region of the embossed depressions. Typical embossing depths can be from about 0.5 μm to 3 μm. Here, the liquid composition can be applied in an amount of only from 1 to 3 g/m$^2$.

It has to be taken into account that the minimal amounts of flux required for the soldering process of plated metal sheets are very low and frequently less than an amount of 3-5 g/m$^2$. In automated application of flux composition over the entire area in accordance with the prior art, layer thicknesses of less than 3 g/m$^2$ have hitherto not been able to be achieved reliably. In addition, flux which has been applied too far away from a soldering point no longer contributes to the soldering process even allowing for the flowing effects on heating in the soldering process.

The plated aluminum sheets which have been coated by means of one or more application rolls of the type described above are subsequently cut to length, with the cut-off section being synchronized with the position of the applied structures if these structures are not exclusively continuous stripes running in the feed direction.

Figure 8:
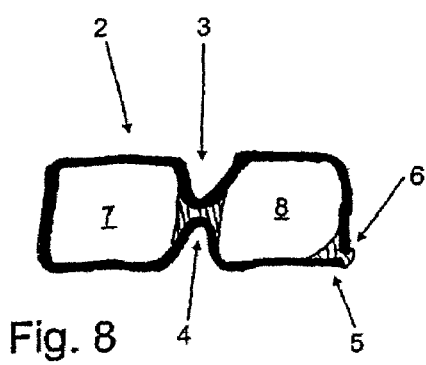
FIG. 8 shows a sketch of a cross-sectional view of a soldered heat exchanger tube.

The sections which have been cut to length are subsequently formed in a manner known per se, e.g. to produce flat tubes having embossed creases. A cross section through such a flat tube is shown in FIG. 8. The tube has a wall 2 which has been bent or formed from the original flat metal sheet of the strip of material. In a middle region, two creases 3, 4 have been embossed, with a stripe of flux composition having been originally applied in the region of the embossing by means of the process of the invention. Further thin stripes have been applied along the margins of the metal sheet. After bending and heating of the preformed flat tube, the abutting creases 3, 4 and the original marginal regions 5, 6 have in each case been soldered to one another. The solder is represented by the hatched region. It can be seen that application of the flux composition to this metal part 2 is required only in the immediate vicinity of the stripe-like soldering positions. The other areas of the interior wall of the two chambers 7, 8 of the flat tube for a heat exchanger which had been formed in this way are not coated with flux, so that the coolant which later flows through the tubes cannot be contaminated by this substance.

Figure 9:
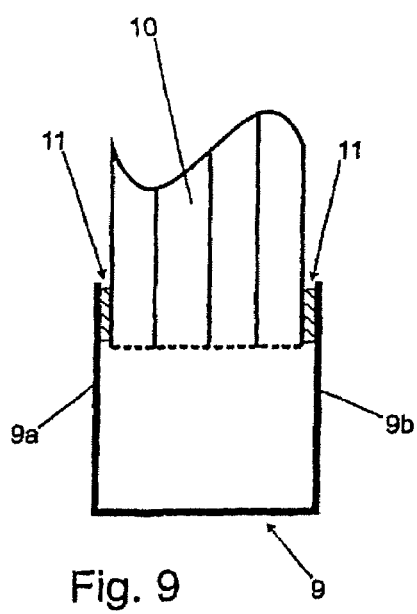
FIG. 9 shows a schematic view of a section through a soldered heat exchanger with metallic collection boxes.

A further example of a metal part according to the invention is a collection box 9 of an all-aluminum heat exchanger (see FIG. 9). The collection box 9, which has an essentially U-shaped cross section, has two legs 9a, 9b. A bundle of exchanger tubes 10 is enclosed only by the outer ends of the legs 9a, 9b and soldered over their area to these end regions of the legs. For this purpose, a flux composition is, according to the invention, applied in an automated fashion only in these regions, by means of which the soldered areas 11 can be achieved. In this embodiment, the flux composition can have layer thicknesses of 30 g/m$^2$ over the regions in which they are applied since relatively large amounts of solder are required for the area soldering of collection boxes and exchanger tube bundles. At such thicknesses of applied flux composition, it is clear that in the case of complete coating of the strip of material with flux (prior art) considerable excess amounts of flux composition would be present. These would lead to contamination of the coolant or refrigerant.

In the abovementioned examples of heat exchangers for motor vehicles, the heat exchangers can be, in particular, heat exchangers for an engine cooling circuit or heat exchangers for an air-conditioning unit.

Figure 10:
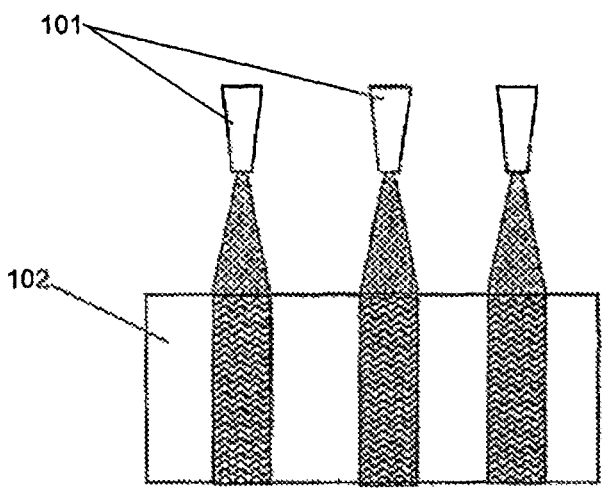
FIG. 10 shows a schematic depiction of a further embodiment of the invention.

FIG. 10 shows a further embodiment of the invention in which the application apparatus for the application of the flux composition comprises one or more spray apparatuses 101. The nozzle-like spray apparatuses 101 are arranged at defined intervals over the moving strip of material 102, in the present case an aluminum band. A sufficiently fluid mixture of the flux composition is squirted or sprayed on by means of the spray apparatuses 101 so that a plurality of parallel stripes of flux composition are formed on the aluminum sheet. The pattern applied can be produced by moving the nozzles and/or interrupting the application in a particular way. Provision of a mask, for example a metal sheet provided with appropriate holes, between the strip of material 102 and the spray apparatus 101 is also possible.

Any of the patterns of flux composition shown by way of example in FIG. 1 to FIG. 7 for the use of application rolls can in principle be produced by use of a spray apparatus.

Depending on requirements, combined use of application roll and spray apparatus is also possible in a process according to the invention.

Figure 11:
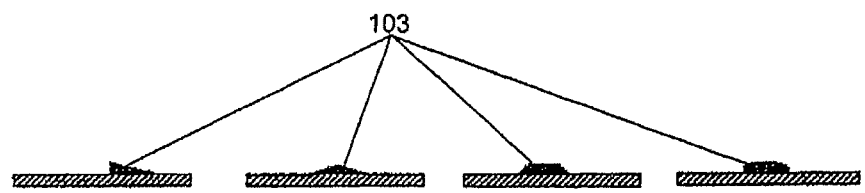
FIG. 11 shows a view of a section through a strip of material with gradated coatings perpendicular to the feed direction.
Figure 12:
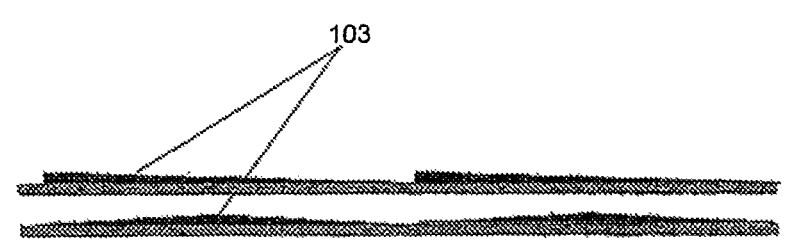
FIG. 12 shows a view of a section through a strip of material with gradated coatings parallel to the feed direction.

FIG. 11 and FIG. 12 show depictions of sections through the strip of material coated with flux composition 103. Here, the section in FIG. 11 runs transverse to the feed direction or direction of motion of the strip of material and in FIG. 12 it runs parallel thereto. To optimize the respective soldering position and the distribution of the solder or flux on heating, the thickness of the flux composition applied is in the present case not homogeneous but gradated, i.e. its thickness can be altered. FIG. 11 and FIG. 12 show, purely by way of example, possible profiles of a gradation or deliberate structuring of the applied flux. It goes without saying that gradated application of flux composition is possible both by means of an application roll and by means of a spray apparatus and also other application methods for the purposes of the invention. Overall, automated and three-dimensionally structured application of flux is at least optionally made possible in this way by a process according to the invention.

The invention claimed is:

1. A process for producing a metal part comprising:
supplying a strip of material composed of a metal; and
applying, by automated application, a coating comprising a flux composition to a surface of the strip of material with a spray apparatus configured to squirt the flux composition, spray the flux composition or a combination thereof onto the strip of material,
wherein the flux composition is applied by the spray apparatus only to a defined part of the surface of the strip of material, and
wherein the flux composition applied by the spray apparatus has at least one gradated region.

2. The process as claimed in claim 1,
wherein the flux composition is passed through a mask during the applying step, the mask having a plurality of holes and being disposed between the spray apparatus and the strip of material.

3. The process as claimed in claim 1, wherein the gradated region comprises a region in which a thickness or a density of the flux composition is altered.

4. A process for producing a metal part comprising:
supplying a strip of material composed of a metal; and
applying, by automated application, a coating comprising a flux composition to a surface of the strip of material with a spray apparatus configured to squirt the flux composition, spray the flux composition or a combination thereof onto the strip of material,
wherein the flux composition is applied by the spray apparatus only to a defined part of the surface of the strip of material,
wherein the flux composition is passed through a mask during the applying step, the mask having a plurality of holes and being disposed between the spray apparatus and the strip of material, and
wherein the metal of the strip of material is an aluminum alloy.

5. The process as claimed in claim 4, further comprising:
cutting a plurality of sections of the strip of material to a length to produce individual coated metal parts.

6. The process as claimed in claim 4, wherein the surface of the strip of material is plated at least partly with a solder.

7. The process as claimed in claim 6, wherein the flux composition does not contain any metallic solder.

8. The process as claimed in claim 4, wherein the flux composition contains a metallic constituent or a chemically bound constituent which becomes metallic during a soldering process.

9. The process as claimed in claim 4, wherein the spray apparatus comprises a plurality of separately controllable spray nozzles.

10. The process as claimed in claim 8, wherein the metallic constituent is a pulverulent metal.

11. A process for producing a metal part comprising:
supplying a strip of material composed of a metal; and
applying, by automated application, a coating comprising a flux composition to a surface of the strip of material with a spray apparatus configured to squirt the flux composition, spray the flux composition or a combination thereof onto the strip of material,
wherein the flux composition is applied by the spray apparatus only to a defined part of the surface of the strip of material,
wherein the flux composition is passed through a mask during the applying step, the mask having a plurality of holes and being disposed between the spray apparatus and the strip of material, and wherein the strip of material is formed to produce a component of a heat exchanger.

12. The process as claimed in claim 11, wherein the component of the heat exchanger is a flat tube.

13. The process as claimed in claim 12, wherein the flat tube is provided with at least one crease or web to produce separate chambers within the tube.

14. The process as claimed in claim 11, wherein the component of the heat exchanger is a collection box.

15. The process as claimed in claim 11, wherein the defined part of the surface comprises at least one stripe running continuously in a feed direction of the strip of material.

16. The process as claimed in claim 11, wherein the defined part of the surface comprises at least one structure which is repeated at regular intervals and does not run continuously in a feed direction of the strip of material.

17. A process for producing a metal part comprising:
supplying a strip of material composed of a metal; and
applying, by automated application, a coating comprising a flux composition to a surface of the strip of material with a spray apparatus configured to squirt the flux composition, spray the flux composition or a combination thereof onto the strip of material,
wherein the flux composition is applied by the spray apparatus only to a defined part of the surface of the strip of material,
wherein the flux composition is passed through a mask during the applying step, the mask having a plurality of holes and being disposed between the spray apparatus and the strip of material, and
wherein the defined part of the strip of material comprise embossed depressions formed by an embossing roll prior to application of the flux composition.

* * * * *